Dec. 12, 1967 T. PELCZYNSKI 3,358,113
PROCESS FOR THE CONTINUOUS PRODUCTION OF
THIN-WALLED STEEL PIPES AND APPARATUS
FOR PUTTING THIS PROCESS INTO EFFECT
Filed May 11, 1964 2 Sheets-Sheet 1
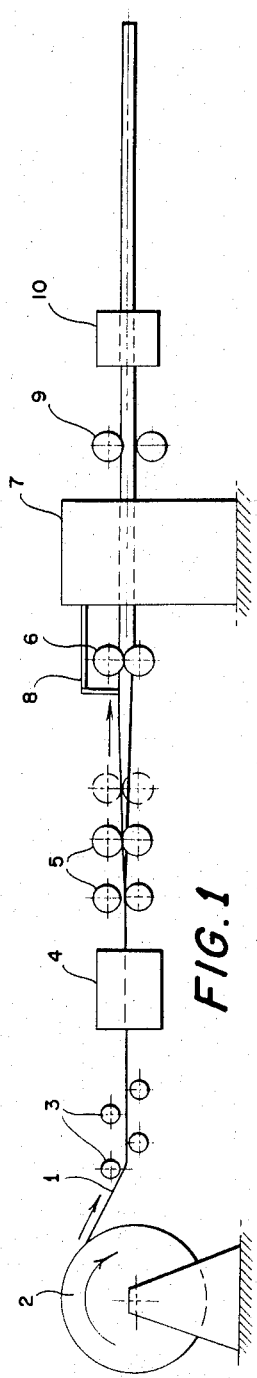
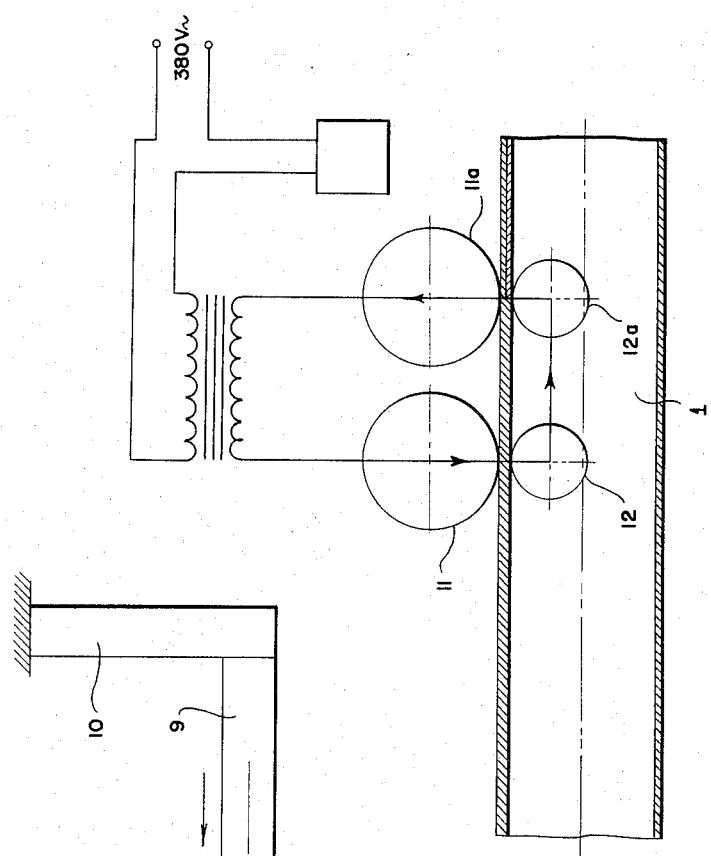
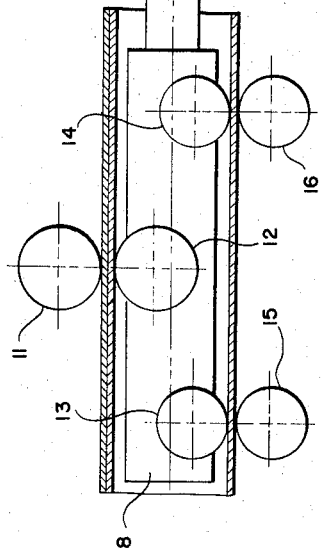
INVENTOR
TADEUSZ PELCZYNSKI
BY *Larson and Taylor*
ATTORNEYS

United States Patent Office 3,358,113
Patented Dec. 12, 1967

3,358,113
PROCESS FOR THE CONTINUOUS PRODUCTION OF THIN-WALLED STEEL PIPES AND APPARATUS FOR PUTTING THIS PROCESS INTO EFFECT
Tadeusz Pełczyński, Warsaw, Poland, assignor to Ministerstwo Obrony Narodowej-Wojskowa Akademia Techniczna, Warsaw, Poland
Filed May 11, 1964, Ser. No. 366,266
Claims priority, application Poland, May 11, 1963, 101,735
6 Claims. (Cl. 219—66)

The present invention relates to a method for the continuous production of thin-walled pipes of any desired length from an overlapped pressure-welded steel strip and to an apparatus for putting this method into effect.

Hitherto known methods and apparatus for the continuous production of pipes from steel strips are concerned with butt-welding or pressure-butt-welding of edges of a conveniently bent strip. There exist also methods and devices for producing overlapped welded pipes but only in sections determined in their length by an outrigger having welding rolls operating in an inside of the pipe. The continuous butt-welding of pipes depends upon the thickness of the steel strip and upon the diameter of the pipes. In hitherto known practice the production of pipes with a diameter of e.g. above 100 mm. and with a wall thickness of below 2 mm. meets with great difficulties and involves considerable costs. In addition, the seam of butt-welded pipes is exposed to very disadvantageous tensile stresses and does not guarantee the strength of the pipes in heavier work conditions. The production of pipes by welding the overlapped edges, in present conditions, is defined to the production of pipes in relatively small sections having a length of some meters and with small diameters.

These drawbacks and inconveniences are eliminated by the method and the apparatus according to the invention.

The method according to the invention consists in a continuous production of pipes with a diameter of more than 100 mm. from a thin, even 1 mm. thick steel strip, by lap-joint pressure welding. The essence of the invention consists in that a pipe produced from a steel strip wound off a drum and conveniently shaped in a known manner by means of shaping rolls, is drawn through a welding system which is provided with sets of welding rolls mounted inside and outside of the bent pipe, welding of the overlapped edges of the steel strip bent into a pipe being carried out by means of a single line seam or of more parallel line seams on the previously formed lap.

Figure 3:
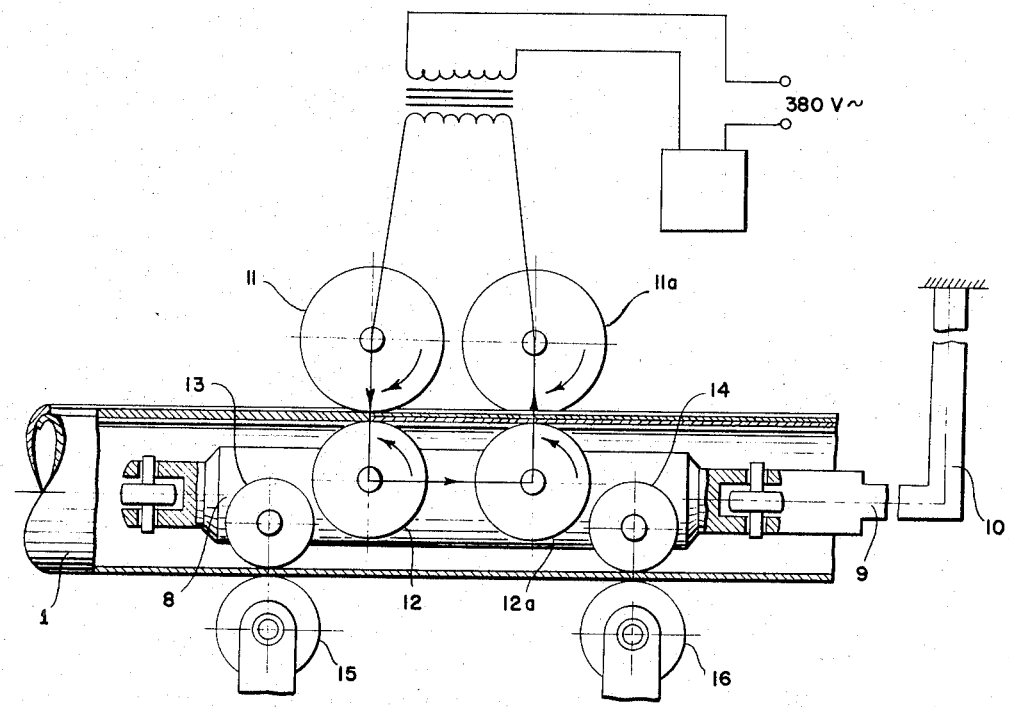
Figure 4:
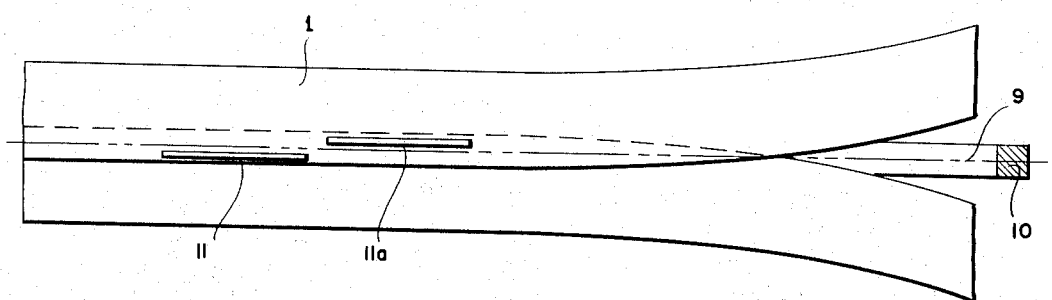

The invention is explained by way of example in the drawing in which FIG. 1 is a schematic view of a general system of an apparatus for the production of thin-walled pipes, FIG. 2 is a diagram showing the production of a single line seam, FIG. 3 is a schematic side-section view of a welder for making two parallel seams, FIG. 4 is a plan view of the same welder arrangement, and FIG. 5 is a schematic view of the secondary electric circuit of the welder of FIG. 3.

The coiled steel strip 1 of desired thickness and width depending on the diameter of the pipes to be produced, is wound off the drum 2, the edges of the strip are cleaned by means of brushes 4 and then the strip is successively drawn through a set of shaping rolls 5, 6, whereupon the pipe is closed by overlapping its edges and is passed through a welder 7 which forms on the lap one or two parallel line-seams.

The pipe thus produced is cut into sections of desired length.

The apparatus for pressure-welding of thin-walled pipes by the method according to the invention, constituting in principle a line welder 7 as shown in FIG. 2 and capable of making a single seam on the lap, is composed of a transformer supplied with alternating current, of a control system and of a head 8 on an outrigger 9 which is fastened to the arm 10. The head 8 is provided with welding rolls 11, 12, running rolls 13, 14 and supporting rolls 15, 16, taking over the pressures exercised by the welding roll 11. The head 8 together wtih the outrigger 9 is placed in the inside of the pipe to be bent, the arm 10 being situated where the pipe to be bent is not yet closed. The current from the secondary winding of the transformer is led to roll 11 wherefrom it flows to roll 12 and then through the body of the head 8 to rolls 13, 14, whereupon the current flows through the pipe-wall to rolls 15, 16 and from here it returns to the current source, thereby providing a closed circuit. The current may also flow from roll 12 and from the body of head 8 to the outrigger 9 of arm 10 and further to the current source. A part of the current flows, of course, also through the pipe to be welded. While welding, the welding roll 11 is pressed by means of a special controlled pneumatic member enabling the pressure-weld to be formed as a single-line seam in the pipe lap on the spot where the rolls 11 and 12 oppose each other.

A modification constitutes an apparatus for performing two parallel seams, as shown in FIGS. 3, 4, 5. The apparatus is similar to the former one but it is provided with two pairs of welding rolls 11, 12 and 11a, 12a, the cooperating pairs being shifted in relation to each other so that the rolls of each cooperating roll pair are on two different generating lines of the pipe, giving two parallel seams on the pipe lap.

The secondary circuit of the transformer passes through roll 11, roll 12, body of head 8, roll 12a and 11a as shown in FIG. 5.

The technology and the apparatus according to the invention render it possible to produce pipes in a continuous manner, of any desired length depending only on the length of the steel strip. The pressure-welds on the lap operating on shearing, ensure a high strength and tightness of the pipe, withstanding considerable pressures up to several times ten atmospheres.

I claim:
1. A method for the continuous production of thin-walled steel pipe of indeterminate length comprising forming a pipe by translating a strip of material while bending it into a generally cylindrical shape with longitudinal edges in overlapped relation, and passing both substantially radial forces and electric current through said overlapped material, through a current conducting and force transmitting structure in said pipe and through a portion of said pipe circumferentially remote from said seam into a force sustaining and current transmitting structure on the outside of said pipe at said remote pipe portion.

2. Apparatus for the continuous production of thin-walled steel pipe of indeterminate length comprising:
(a) means for translating a strip of material longitudinally and for simultaneously bending said strip into a generally closed configuration about its longitudinal axis, with edges thereof in overlapped relation,
(b) a head positioned within said closed strip,
(c) means on the outside of said pipe and on said head for compressing said overlapped edges between them and for providing a path for current flow through said means, said overlapped edges and into said head,
(d) and means on the outside of said pipe and on said head in engagement with a portion of said strip circumferentially remote from said overlapped edges for passing force and current from said head through said strip and to said second mentioned means on the outside of said strip.

3. The apparatus of claim 2, wherein said compressing means comprises a pair of opposed rollers.

4. The apparatus of claim 2, wherein said compressing means comprises two pair of opposed rollers in circumferentially spaced relationship.

5. The apparatus of claim 2, wherein said force and current passing means comprises two pair of opposed rollers, axially spaced from said compressing means.

6. Apparatus for the continuous production of thin-walled steel pipe of indeterminate length comprising:
  (a) means for translating a strip of material longitudinally and for simultaneously bending said strip into a generally closed configuration about its longitudinal axis, with edges thereof in overlapped relation,
  (b) a head positioned within said closed strip having first roller means engaging said strip at said overlapped portion,
  (c) said head having supporting roller means engaging the interior of said strip at a place circumferentially remote from said first roller means,
  (d) roller means exteriorly of said strip and compressively engaging said strip with said first roller means for compressing said overlapped strip therebetween and for providing a current path through said exterior roller means, said strip at said overlap, said first roller means and into said head,
  (e) and supporting roller means engaging the exterior of said strip in opposed relation to said supporting roller means on said head; said head, supporting roller means thereon, pipe and exterior supporting roller means providing a current path.

References Cited

UNITED STATES PATENTS

| | | | |
|---|---|---|---|
| 977,711 | 12/1910 | Craven | 219—67 |
| 2,208,676 | 7/1940 | Kosman | 219—66 |
| 2,322,796 | 6/1943 | Fentress | 219—66 X |

FOREIGN PATENTS

| | | |
|---|---|---|
| 74,620 | 9/1918 | Austria. |
| 263,783 | 3/1927 | Great Britain. |

RICHARD M. WOOD, *Primary Examiner.*

J. V. TRUHE, *Examiner.*